May 28, 1957 G. E. MOORE 2,793,887
INSULATION HANGER
Filed Sept. 20, 1954

INVENTOR.
GOODLOE E. MOORE.

BY Lockwood, Galt, Woodard & Smith
ATTORNEYS.

United States Patent Office 2,793,887
Patented May 28, 1957

2,793,887
INSULATION HANGER
Goodloe E. Moore, Danville, Ill.

Application September 20, 1954, Serial No. 457,226

1 Claim. (Cl. 287—20.5)

This invention relates to a hanger fixture, and more particularly to an insulation hanger adapted for cementitious connection to a surface for supporting insulation on such surface.

Heretofore conventional hanger fixtures have consisted of a comparatively thin metal plate and an elongated bendable prong portion or spindle extending perpendicularly thereto and positioned substantially centrally thereof. It has been conventional for the spindle to be secured to the plate prior to shipment either by spot welding or by using an adhesive cement. Because of the shape and configuration of these assembled hangers they have required considerable space in shipment and in storage thereby adding appreciably to their expense.

It is the primary object of the present invention to provide a hanger fixture of such character and construction that it may be shipped and stored in the knockdown and yet may be assembled with ease by the user. For example, the user can wear an apron and place the spindles in one pocket and the plates in another. All he has to do in order to assemble the fixture is to take a spindle out of one of the pockets and the plate out of the other, then join the two with hand pressure until they are frictionally locked. This procedure does away with bulky, space consuming boxes.

It is a still further boject of the present invention to provide a hanger fixture of the character described in which the spindle and the plate portion may be assembled with greater speed than they could be assembled were they to be spot-welded and adhesively secured.

It is a still further object of the present invention to provide a base plate formed of a material such for example as black nylon, that will have sufficient resiliency and flexibility to retain and lock the spindle and the plate firmly together in friction-grip relation.

The primary feature of the present invention resides in forming a socket with a smaller, centrally located opening in such manner that upon the seating therewithin of the spindle it will be firmly locked and retained in place in a friction fit. This is accomplished best by forming the smaller hole as an ellipse with its short diameter fractionally less than that of the spindle. As an alternative, both the aperture and the socket may be formed with radially projecting nubs of black nylon or other material with similar properties.

Figure 1:
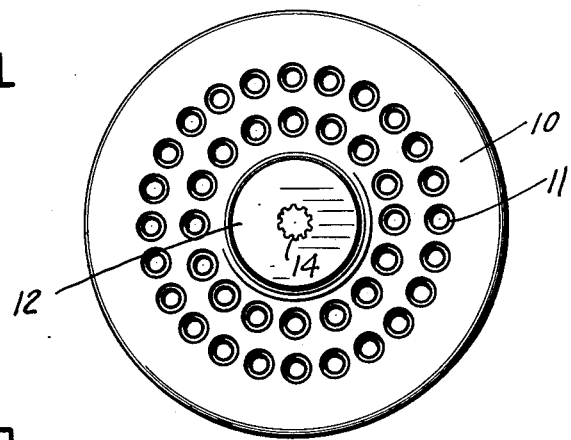

The full nature of the invention will be understood from the accompanying drawings and the following description and claim:

In the drawings Fig. 1 is a top plan view of the base plate with the prong portion or spindle removed therefrom.

Figure 2:
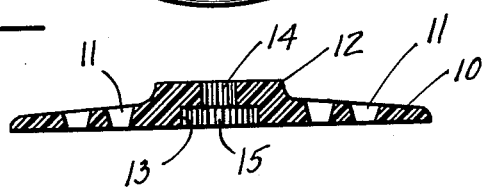
Figure 3:
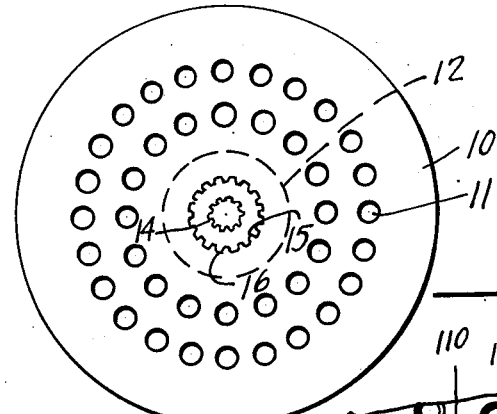
Figure 4:
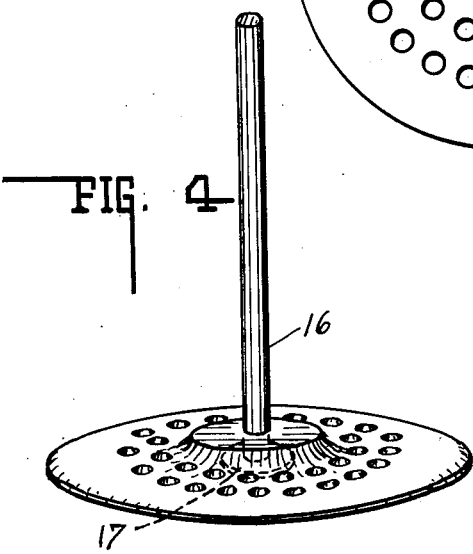
Figure 5:
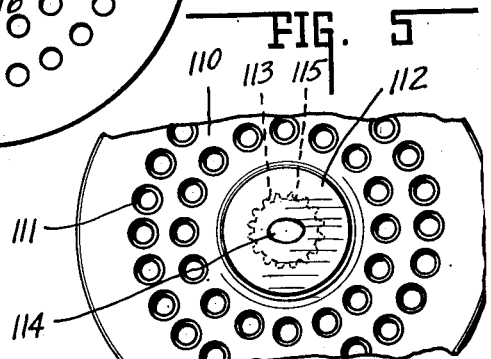

Fig. 2 is a vertical sectional view of said base plate.
Fig. 3 is a bottom plan view of said base plate.
Fig. 4 is a perspective view of the assembled base plate and prong portion.
Fig. 5 is a modified form of the plate shown in Fig. 1 with parts broken away.

In the drawings the base plate is indicated generally at 10, it consisting of a comparatively thin substantially flat black nylon disc having foraminations 11 formed therein in spaced arcuate relation. It will be understood that an adhesive is employed to secure the plate to a duct, ceiling, wall or other surface. The foraminations provide sockets for the reception of the adhesive and, as well, facilitate evaporation of the solvent used in the adhesive.

The plate has a centrally located embossment 12 projecting from one face thereof. A socket 13 is formed by the embossment in the other face of the plate and a concentric opening or aperture 14 extends through the embossment, communicating with the socket. The socket and aperture are defined by a wall having a plurality of arcuately spaced, radially extending projections or nubs 15 formed therein. These nubs extend inwardly into the path traversed by a metal prong or spindle 16 as it is joined to the plate. That is to say, the diameter of a head 17 of the spindle and the diameter of its shank immediately adjacent the head are slightly greater than the distance separating one nub from its diametrically opposite nub.

In shipping or storing the invention the base plate and spindle are not assembled but are in the knockdown. Thus a substantially greater number may be packaged in a carton than could be where the plate and spindle are shipped in assembled condition. Once, however, it is desired to assemble the two members it is necessary only to pass the spindle through the openings until the head and shank are in engagement with the nubs that intersect the spindle's path of travel, as aforesaid. At such time hand pressure or the like may be used to drive the spindle in further until the head is seated within the socket with no portion projecting beyond the plane of the bottom of the plate. By reason of the natural resiliency of the nylon, the nubs will have flexed or retracted a sufficient distance to enable the spindle to be seated, and yet will be in frictional engagement with the head and shank of the spindle so as to lock it firmly in position.

In the modified form of the invention shown in Fig. 5 a plate 110 also has a plurality of foraminations 111 formed therein in spaced arcuate relation. Extending upwardly from the central part of the plate is an embossment 112. A socket indicated by dotted lines at 113 is formed by the embossment in the face of the plate opposite to that appearing in Fig. 5, and an opening or aperture 114 extends through the embossment, communicating with the socket. While the socket is provided with radially extending projections or nubs 115, as in the already illustrated embodiment of the invention, the aperture or opening is formed as an ellipse without those nubs or projections. By way of illustration the diameter of the spindle may be .1046 with an allowable tolerance of plus and minus .002. The short diameter of the ellipse is .102 whereas the long diameter is .107. By reason of the characteristics of the black nylon used in forming the plate, when the spindle is "thrust home" it will be firmly seated and anchored in friction-grip relation within the aperture and socket.

While the invention has been illustrated and described in detail in the drawings and foregoing description, the same is to be considered as illustrative and not restrictive in character, it being understood that only the preferred embodiment has been shown and described and that all changes and modifications that come within the teaching of the invention and the scope of the claim are also desired to be protected.

The invention claimed is:

A hanger fixture adapted for cementitious application to a support to anchor securely other material to that support, comprising a base plate having an apertured embossment projecting from one face of the plate and forming a socket larger than the aperture of the embossment on the opposite face thereof, the wall defining the socket having a plurality of radially extending flexible projections and the wall defining the aperture in said embossment being formed in an ellipse, and an elongated member having a diameter slightly greater than the short diameter of the ellipse seatable in the aperture and having an enlarged head seatable in the socket, said projections and the walls defining said ellipse embracing said member in a friction grip.

References Cited in the file of this patent

UNITED STATES PATENTS

| | | |
|---|---|---|
| 1,971,396 | De Waide | Aug. 28, 1934 |
| 2,327,891 | Herman | Aug. 24, 1943 |
| 2,385,296 | Moore | Sept. 18, 1945 |

FOREIGN PATENTS

| | | |
|---|---|---|
| 845,467 | France | May 15, 1939 |